United States Patent
Annavajjala et al.

(10) Patent No.: US 11,595,119 B2
(45) Date of Patent: Feb. 28, 2023

(54) PROTECTION SWITCHING BASED ON EXCHANGE OF PROTECTION INFORMATION

(71) Applicant: Cisco Technology, Inc., San Jose, CA (US)

(72) Inventors: Raghunandan Annavajjala, Bangalore (IN); Sudhir Kayamkulangara, Karnataka (IN); Christian Schmutzer, Koenigsbrunn Im Weinviertel (AT); Luca Della Chiesa, Concorezzo (IT); Rayen Mohanty, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/145,862

(22) Filed: Jan. 11, 2021

(65) Prior Publication Data
US 2022/0224410 A1 Jul. 14, 2022

(51) Int. Cl.
*H04B 10/032* (2013.01)
*H04L 45/00* (2022.01)
*H04Q 11/00* (2006.01)

(52) U.S. Cl.
CPC .......... *H04B 10/032* (2013.01); *H04L 45/22* (2013.01); *H04Q 11/0005* (2013.01); *H04Q 11/0066* (2013.01); *H04Q 2011/0033* (2013.01); *H04Q 2011/0081* (2013.01)

(58) Field of Classification Search
None
See application file for complete search history.

(56) References Cited

U.S. PATENT DOCUMENTS

| | | | |
|---|---|---|---|
| 6,795,394 B1* | 9/2004 | Swinkels | H04J 3/085 370/221 |
| 8,289,845 B1* | 10/2012 | Baldonado | H04L 43/16 709/239 |
| 2004/0033077 A1* | 2/2004 | Kim | H04Q 11/0067 398/72 |
| 2005/0099941 A1 | 5/2005 | Sestito et al. | |

(Continued)

OTHER PUBLICATIONS

Gringeri et al: "Private Line Emulation over Packet Switched Networks", Internet Engineering Task Force (IETF), Jul. 12, 2020, pp. 1-18 (Year: 2020).*

(Continued)

*Primary Examiner* — Li Liu
(74) *Attorney, Agent, or Firm* — Edell, Shapiro & Finnan, LLC (57) ABSTRACT

In one example, a first Provider Edge (PE) node is configured to communicate with a second PE node through a packet-switched network and with a third PE node through the packet-switched network. The first PE node communicates with a fourth PE node via the second PE node. The fourth PE node is configured to communicate with the second PE node over a working path through a time-division multiplexing transport network. The first PE node exchanges, with the fourth PE node, protection information. Based on exchanging the protection information, the first PE node communicates with the fourth PE node via the third PE node. The fourth PE node is further configured to communicate with the third PE node over a protection path through the time-division multiplexing transport network.

20 Claims, 9 Drawing Sheets

(56) References Cited

U.S. PATENT DOCUMENTS

| | | | |
|---|---|---|---|
| 2005/0123294 A1* | 6/2005 | Mascolo | H04J 3/085 398/19 |
| 2005/0213508 A1 | 9/2005 | Gerstel | |
| 2006/0098660 A1 | 5/2006 | Pal et al. | |
| 2006/0115266 A1* | 6/2006 | Levi | H04L 1/22 398/19 |
| 2006/0198695 A1* | 9/2006 | Kano | H04L 45/22 403/408.1 |
| 2007/0253326 A1* | 11/2007 | Saha | H04L 12/4641 370/217 |
| 2007/0280102 A1* | 12/2007 | Vasseur | H04L 47/825 370/225 |
| 2008/0002669 A1 | 1/2008 | O'Brien et al. | |
| 2009/0169200 A1* | 7/2009 | Li | H04J 14/0282 398/7 |
| 2010/0014858 A1* | 1/2010 | Barbarossa | H04L 49/557 398/45 |
| 2010/0135291 A1* | 6/2010 | Martin | H04L 45/00 370/389 |
| 2012/0147737 A1* | 6/2012 | Taylor | H04L 41/08 370/219 |
| 2014/0328158 A1* | 11/2014 | Shao | H04L 45/22 370/218 |
| 2015/0093110 A1* | 4/2015 | O'Byrne | H04Q 11/0005 398/48 |
| 2020/0153525 A1 | 5/2020 | Annavajjala et al. | |

OTHER PUBLICATIONS

International Telecommunication Union, "Interworking of SDH network protection architectures", Recommendation G.842, Apr. 1997, 39 pages.
J. Kuhfeld et al., "Definitions of Managed Objects for Synchronous Optical Network (SONET) Linear Automatic Protection Switching (APS) Architectures", Network Working Group, Request for Comments: 3498, Category: Standards Track, Mar. 2003, 43 pages.
Y. Weingarten, Ed. et al., "MPLS Transport Profile (MPLS-TP) Linear Protection", Internet Engineering Task Force (IETF), Request for Comments: 6378, Category: Standards Track, ISSN: 2070-1721, Oct. 2011, 45 pages.
N. Sprecher, Ed. et al., "MPLS Transport Profile (MPLS-TP) Survivability Framework", Internet Engineering Task Force (IETF), Request for Comments: 6372, Category: Informational, ISSN: 2070-1721, Sep. 2011, 56 pages.
Telcordia Technologies, Inc., "Synchronous Optical Network (SONET) Transport Systems: Common Generic Criteria", Telcordia Technologies Generic Requirements GR-253-CORE, Issue 4, Dec. 2005, 697 pages.
W. Cheng et al., "Dual-Homing Coordination for MPLS Transport Profile (MPLS-TP) Pseudowires Protection", Internet Engineering Task Force (IETF), Request for Comments: 8185, Category: Standards Track, ISSN: 2070-1721, Jun. 2017, 17 pages.
W. Cheng et al., "Dual-Homing Protection for MPLS and the MPLS Transport Profile (MPLS-TP) Pseudowires", Internet Engineering Task Force (IETF), Request for Comments: 8184, Category: Informational, ISSN: 2070-1721, Jun. 2017, 11 pages.
International Telecommunication Union, "Dual-homing protection for multi-protocol label switching transport profile pseudowires", Recommendation ITU-T G.8133, Aug. 2019, 22 pages.
A. Vainshtein, Ed. et al., "Structure-Agnostic Time Division Multiplexing (TDM) over Packet (SAToP)", Network Working Group, Request for Comments: 4553, Category: Standards Track, Jun. 2006, 27 pages.
International Telecommunication Union, "Optical Transport Network (OTN): Linear protection", Recommendation ITU-T G.873.1, Jul. 2011, 30 pages.
Cisco, "Automatic Protection Switching Configuration", downloaded from the Internet Dec. 5, 2020, 6 pages.
Cisco Community, "ICRM and PGP sessions (MR-APS with stateful MLPPP)", Jun. 30, 2016, 5 pages.
International Telecommunication Union, "Ethernet linear protection switching", Recommendation ITU-T G.8031/Y.1342, Jan. 2015, 96 pages.
IEEE, "G.8031 1:1 Linear Protection Switching", ITU-T Q9 SG15, https://www.ieee802.org/1/files/public/docs2007/liaison-itutq915-g8031-in-pbbte.pdf, downloaded from the Internet Dec. 3, 2020, 16 pages.
RF Wireless World 2012, "Automatic Protection Switching,APS,SDH,SONET", https://www.rfwireless-world.com/Articles/APS-Automatic-Protection-Switching-SDH-SONET.html, downloaded from the Internet Sep. 14, 2020, 7 pages.
Cisco, "Overview", Cisco Nexus 7000 Series NX-OS MPLS Configuration Guide, downloaded from the Internet Sep. 13, 2020, 10 pages.
Cisco, "Configuring Redundancy for POS/APS", Document ID: 14680, http://www.cisco.com/warp/customer/127/POS/pos-aps_14680.html, Jan. 10, 2006, 15 pages.
Cisco Systems, Inc., "Time Division Multiplexing Configuration Guide, Cisco IOS XE Release 3S (Cisco ASR 900 Series)", Nov. 1, 2014, 166 pages.
International Telecommunication Union, "Ethernet ring protection switching", Recommendation ITU-T G.8032/Y.1344, Mar. 2020, 82 pages.
International Telecommunication Union, "Ethernet linear protection switching", Amendment 1, Recommendation ITU-T G.8031/Y.1342, Mar. 2018, 98 pages.
International Telecommunication Union, "Optical transport network: Linear protection", Recommendation ITU-T G.873.1(2017)/Corrigendum 1, Mar. 2020, 40 pages.
International Telecommunication Union, "Interfaces for the optical transport network", Recommendation ITU-T G.709/Y.1331, Jun. 2020, 280 pages.
G. Mirsky et al., "Simple Two-way Active Measurement Protocol Optional Extensions draft-ietf-ippm-stamp-option-tlv-10", Network Working Group, Nov. 15, 2020, 32 pages.
R. Gandhi, Ed. et al., "Performance Measurement Using Simple Twamp (STAMP) for Segment Routing Networks draft-gandhi-spring-stamp-srpm-04", Spring Working Group, Jan. 12, 2021, 21 pages.
Iana, "Generic Associated Channel (G-ACh) Parameters", Feb. 7, 2014, 10 pages.
G. Mirsky et al., "RFC 8762 Simple Two-Way Active Measurement Protocol", Internet Engineering Task Force (IETF), ISSN: 2070-1721, Mar. 2020, 15 pages.
S. Boutros et al., "Virtual Private Wire Service Support in Ethernet VPN", Internet Engineering Task Force (IETF), ISSN: 2070-1721, Aug. 2017, 17 pages.
W. Cheng et al., "Dual-Homing Coordination for MPLS Transport Profile (MPLS-TP) Pseudowires Protection", Internet Engineering Task Force (IETF), ISSN: 2070-1721, Jun. 2017, 17 pages.
S. Bryant et al., "UDP Return Path for Packet Loss and Delay Measurement for MPLS Networks", Internet Engineering Task Force (IETF), Jul. 2016, 10 pages.
A. Sajassi, Ed. et al., "BGP MPLS-Based Ethernet VPN", Internet Engineering Task Force (IETF), ISSN: 2070-1721, Feb. 2015, 56 pages.
D. Frost et al., "Packet Loss and Delay Measurement for MPLS Networks", Internet Engineering Task Force (IETF), ISSN: 2070-1721, Sep. 2011, 52 pages.
M. Bocci, Ed. et al., "MPLS Generic Associated Channel", Network Working Group, Jun. 2009, 19 pages.
K. Hedayat et al., "A Two-Way Active Measurement Protocol (TWAMP)", Network Working Group, Oct. 2008, 26 pages.
S. Shalunov et al., "A One-way Active Measurement Protocol (OWAMP)", Network Working Group, Sep. 2006, 56 pages.
S. Bryant et al., "Pseudowire Emulation Edge-to-Edge (PWE3) Control Word for Use over an MPLS PSN", Network Working Group, Feb. 2006, 12 pages.

* cited by examiner

PROTECTION SWITCHING BASED ON EXCHANGE OF PROTECTION INFORMATION

TECHNICAL FIELD

The present disclosure relates to telecommunications technology.

BACKGROUND

Historically, Circuit Emulation (CEM) technology refers to the transport of Time-Division Multiplexing (TDM) traffic (e.g., Plesiochronous Digital Hierarchy (PDH) traffic, Synchronous Optical Networking (SONET)/Synchronous Digital Hierarchy (SDH) traffic, etc.) across a Packet-Switched Network (PSN). These circuits can be handed off from the PSN to a TDM transport network. The TDM traffic can be circuit-emulated for client traffic in the PSN.

DESCRIPTION OF EXAMPLE EMBODIMENTS

Overview

In one example embodiment, a first provider edge node is configured to communicate with a second provider edge node through a packet-switched network and with a third provider edge node through the packet-switched network. The first provider edge node communicates with a fourth provider edge node via the second provider edge node. The fourth provider edge node is configured to communicate with the second provider edge node over a working path through a time-division multiplexing transport network. The first provider edge node exchanges, with the fourth provider edge node, protection information. Based on exchanging the protection information, the first provider edge node communicates with the fourth provider edge node via the third provider edge node. The fourth provider edge node is further configured to communicate with the third provider edge node over a protection path through the time-division multiplexing transport network.

Example Embodiments

Figure 1:
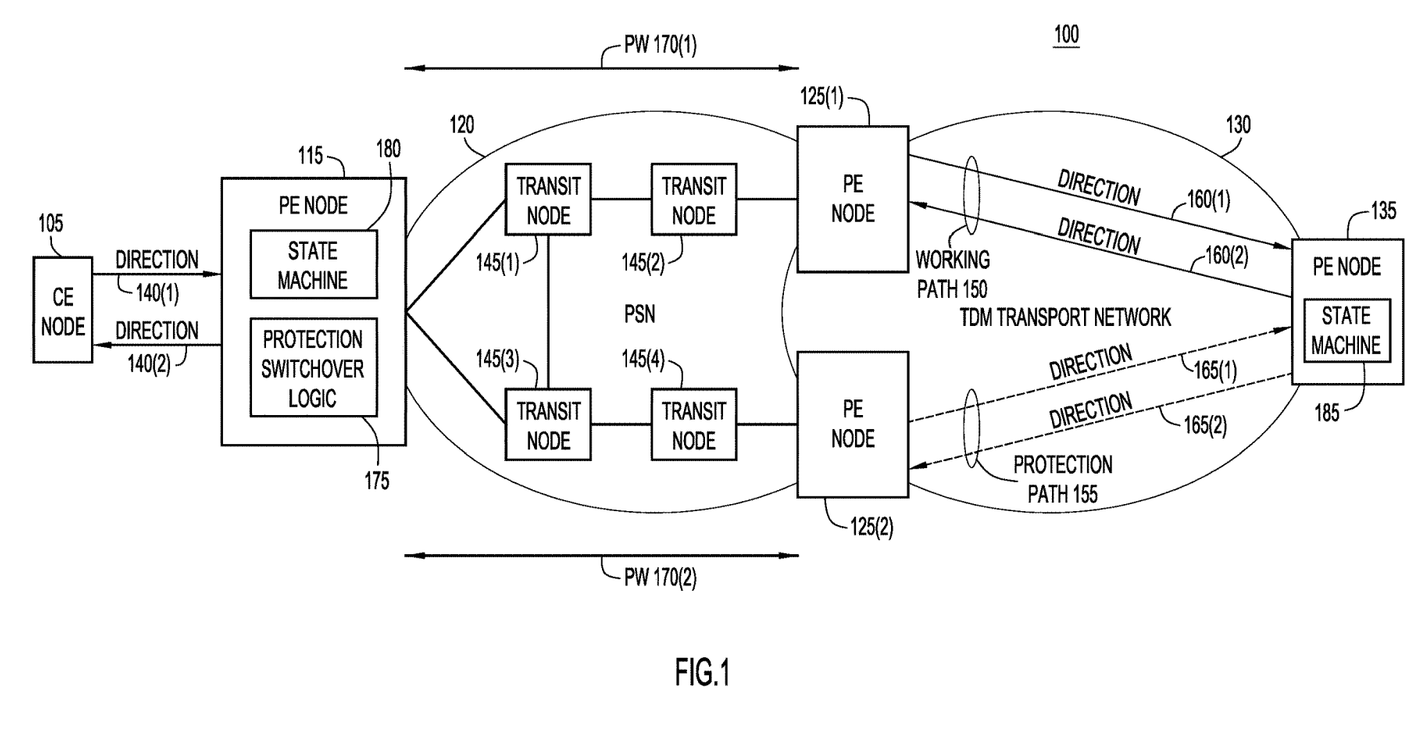
FIG. 1 illustrates a block diagram of a system configured for protection switching based on an exchange of protection information, according to an example embodiment.

FIG. 1 illustrates a block diagram of an example system 100 configured for protection switching based on an exchange of protection information. System 100 includes Customer Edge (CE) node 105, Provider Edge (PE) node 115, Packet-Switched Network (PSN) 120, PE node 125(1) and PE node 125(2), Time-Division Multiplexing (TDM) transport network 130, and PE node 135. PSN 120 and TDM transport network 130 may be considered as a single hybrid network with PE node 115 and PE node 135 as respective edge nodes of the hybrid network. PE node 135 may also be referred to as a trail termination endpoint.

One or more links may be configured to carry signals in direction 140(1) from CE node 105 to PE node 115 and/or in direction 140(2) from PE node 115 to CE node 105. PSN 120 includes transit nodes 145(1)-145(4). TDM transport network 130 includes working path 150 and protection path 155. Working path 150 may be configured to carry signals in direction 160(1) (e.g., from PE node 125(1) to PE node 135) and direction 160(2) (e.g., from PE node 135 to PE node 125(1)), and protection path 155 may be configured to carry signals in direction 165(1) (e.g., from PE node 125(2) to PE node 135) and direction 165(2) (e.g., from PE node 135 to PE node 125(2)). It will be appreciated that TDM transport network 130 may include one or more transit nodes configured to carry signals between PE node 135 and PE node 125(1) and/or PE node 125(2).

PSN 120 may utilize any suitable transport mechanism, such as Ethernet. TDM transport network 130 may utilize any suitable transport mechanism(s), such as Synchronous Optical Network (SONET), Synchronous Digital Hierarchy (SDH), Optical Transport Networking (OTN) technology.

PE node 135 may be configured to communicate with PE node 125(1) over working path 150 through TDM transport network 130 in direction 160(1) and/or direction 160(2). PE node 135 may be further configured to communicate with PE node 125(2) over protection path 155 through TDM transport network 130 in direction 165(1) and/or direction 165(2).

In one example, Pseudowire (PW) 170(1) may be configured on PE node 115 and PE node 125(1), and PW 170(2) may be configured on PE node 115 and PE node 125(2). PE node 115 may be configured to communicate with PE node 125(1) through PSN 120. Transit nodes 145(1)-145(4) may be configured to carry PW network packets over PSN 120 between PE node 115 and PE node 125(1). PE node 115 may be further configured to communicate with PE node 125(2) through PSN 120. Transit nodes 145(1)-145(4) may be configured to carry PW network packets over PSN 120 between PE node 115 and PE node 125(2). Transit nodes 145(1)-145(4) may be agnostic to PW 170(1) and PW 170(2).

PW 170(1) and PW 170(2) may be established via any suitable technology, such as Targeted Label Distribution Protocol (T-LDP) for Virtual Private Wire Service (VPWS) or Border Gateway Protocol (BGP) as defined by Ethernet Virtual Private Network for VPWS (EVPN-VPWS). In one example, PW 170(1) and/or PW 170(2) may belong to a Private Line Emulation (PLE) circuit. To that end, PE node 115, PE node 125(1), and PE node 125(2) may be configured to communicate using PLE techniques, although it will be appreciated that other scenarios, such as Circuit Emulation (CEM), may also apply. In another example, Ethernet VPWS may be used in conjunction with Ethernet over SONET across (e.g., SONET-based) TDM transport network 130.

PSN 120 may include a mesh topology with PE node 125(1) and PE node 125(2) acting as gateway nodes to TDM transport network 130. PSN 120 may run Multiprotocol Label Switching (MPLS), an Interior Gateway Protocol (IGP) such as Open Shortest Path First (OSPF) or Intermediate System-to-Intermediate System (IS-IS), or any combination thereof. PSN 120 may also run a traffic engineering protocol such as Resource Reservation Protocol for Traffic Engineering (RSVP-TE) or Segment Routing for Traffic Engineering (SR-TE).

Furthermore, any suitable paradigm/protocol may be utilized in conjunction with the techniques presented herein for PSN 120. PSN 120 may use any suitable packet switching and/or tunneling technology, such as Layer 2 Tunneling Protocol (L2TP), User Datagram Protocol (UDP), Internet Protocol (IP), etc. PSN 120 may also/alternatively be based on IP or Segment Routing for IP version 6 (SRv6).

System 100 may offer port redundancy protections to ensure that communication between PE node 115 and PE node 135 is uninterrupted. For communications from CE node 105 to PE node 135 (e.g., during imposition), CE node 105 may send a signal (e.g., an optical signal) in direction 140(1) to PE node 115. In one example, PE node 115 may receive the optical signal via a TDM port. PE node 115 may convert (e.g., packetize) the optical signal into one or more network packets, and may further duplicate the one or more network packets to generate a first copy of the one or more network packets and a second copy of the one or more network packets and send the copies toward PE nodes 125(1) and 125(2).

In one specific example, PE node 115 may multicast packets toward PE node 125(1) and PE node 125(2). PE node 115 may send the first copy of the one or more network packets via PW 170(1) to PE node 125(1). PE node 115 may send the second copy of the one or more network packets via PW 170(2) to PE node 125(2). Thus, both PW 170(1) and PW 170(2) are active. This setup may be referred to as an active-active PW setup.

PE node 125(1) may convert (e.g., de-packetize) the first copy of the one or more network packets into a first TDM signal. Similarly, PE node 125(2) may convert (e.g., de-packetize) the second copy of the one or more network packets into a second TDM signal. PE node 125(1) may send the first TDM signal in direction 160(1) to PE node 135. Similarly, PE node 125(2) may send the second TDM signal in direction 165(1) to PE node 135.

PE node 135 may receive both the first TDM signal and the second TDM signal, and may further select the first TDM signal for use because the first TDM signal was received over working path 150. In other words, from the point of view of PE node 135, there may be two circuits, including working path 150 (from PE node 125(1)) and protection path 155 (from PE node 125(2)).

For communications from PE node 135 to CE node 105 (e.g., during disposition), PE node 135 may send a first TDM signal in direction 160(2) to PE node 125(1). Similarly, PE node 135 may send a second TDM signal in direction 165(2) to PE node 125(2). The first and second TDM signals may be similar/identical to each other. PE node 125(1) may convert (e.g., packetize) the first TDM signal into a first copy of one or more network packets, and PE node 125(2) may convert (e.g., packetize) the second TDM signal to a second copy of one or more network packets. PE node 125(1) may send the first copy of the one or more network packets via PW 170(1) to PE node 115. PE node 125(2) may send the second copy of the one or more network packets via PW 170(2) to PE node 115.

PE node 115 may receive both the first copy of the one or more network packets and the second copy of the one or more network packets. PE node 115 may select the first copy of the one or more network packets for use because the first copy of the one or more network packets was received via a port associated with PW 170(1) and working path 150. Thus, PE node 115 may decide which copy of the one or more network packets to select based on which copy was transmitted over PW 170(1) and working path 150. PE node 115 may convert (e.g., de-packetize) the first copy of the one or more network packets to a signal (e.g., an optical signal). The signal may be similar/identical to the first and second signals sent from PE node 135 in direction 160(2) and direction 165(2), respectively. PE node 115 may further send the signal in direction 140(2) to CE node 105.

Sometimes, a loss of communication can occur between PE node 115 and PE node 135 via PE node 125(1). This can arise, for example, if there is a path failure (e.g., fiber cut) in working path 150, or a failure of PW 170(1) (e.g., one or more of transit nodes 145(1)-145(4) go down). When a loss of communication occurs, system 100 may switch over from PW 170(1)/working path 150 to PW 170(2)/protection path 155. Upon switchover, PE node 115 and PE node 135 may communicate via PE node 125(2) over PW 170(2)/protection path 155.

Conventional switchover mechanisms would rely on a communication channel between PE node 125(1) and PE node 125(2). Conventionally, PE node 125(1) and PE node 125(2) would synchronize the switchover with each other by exchanging messages over the communication channel. PE node 125(1) and PE node 125(2) would use additional dedicated protocols (e.g., Inter Chassis Redundancy Manager (ICRM), Protect Group Protocol (PGP), etc.) to communicate respective statuses and carry out the switchover. For example, PE node 125(2) would typically send, to PE node 125(1) via the communication channel, an indication that PE node 125(2) is to handle communications between PE node 115 and PE node 135 instead of PE node 125(1). However, such a communication channel is often unavailable, as is the case in system 100. Thus, conventional switchover mechanisms would fail to effectuate a switchover in system 100 and in other systems where the aforementioned communication channel is unavailable. And even if a communication channel is available, as noted, a dedicated protocol is required to effectuate communication between PE node 125(1) and PE node 125(2). Accordingly, protection switchover logic 175 is provided on PE node 115 to enable switchover without requiring a communication channel, or the use of additional protocols such as ICRM or PGP, between PE node 125(1) and PE node 125(2). In particular, instead of relying upon PE node 125(1) and PE node 125(2) to control switchover, as would be done conventionally, control is instead shifted to PE node 115 and PE node 135. Thus, PE node 115 and PE node 135, rather than PE node 125(1) and PE node 125(2), may exchange communications to enable switchover.

Briefly, PE node 115 may communicate with PE node 135 via PE node 125(1). For example, PE node 115 may initially send and/or receive data packets from/to PE node 135 via PW 170(1) and working path 150. PE node 115 may exchange, with PE node 135, protection information that may relate to any of a variety of protection switch reasons. In one example, the protection information may relate to a loss of communication between PE node 115 and PE node 135 via PE node 125(1). For instance, the protection information may indicate that there is a path failure in working path 150 or a failure of PW 170(1). While loss of communication is used herein as one example of protection information, it will be appreciated that the protection information may include any suitable information. For example, the protection information may relate to any suitable reason or need for initiating protection switching, including signal degradation, signal defects, functions such as forced switch, manual switch (e.g., operator-triggered switch requests), etc.

In one example, when the loss of communication occurs, PE node 115 may exchange the protection information with PE node 135 via PE node 125(2). PE node 115 may further communicate with PE node 135 via PE node 125(2). For example, once the protection information has been exchanged, PE node 115 may send and/or receive data packets from/to PE node 135 via PW 170(2) and protection path 155.

In one example, the protection information may include one or more bits or bytes indicative of the protection information. The one or more bits or bytes may include Automatic Protection Switching (APS) bytes (e.g., APS Protection Communication Channel (PCC) bytes), K1 bytes and/or K2 bytes (hereinafter "K1/K2 bytes"), etc. K1/K2 bytes may apply to SONET/SDH technology, and APS/PCC techniques may apply to OTN technology. Specific examples are provided herein with respect to K1/K2 bytes, but it should be appreciated that K1/K2 bytes (and APS/PCC bytes) are non-exclusive examples of protection information, and any suitable protection information may be used in accordance with the techniques described herein.

Protection information may indicate the status of working path 150 and/or protection path 155. Protection information may further indicate the protection switching architecture (e.g., 1:1, 1:2, 2:N, etc.). PE node 115 and PE node 135 may use protection information to control switchover from PW 170(1)/working path 150 to PW 170(2)/protection path 155. For example, an "all-ones" K1/K2 bytes message may indicate that a failure has occurred.

PE node 115 and PE node 135 may consume/terminate the protection information. In a further example, PE node 115 includes state machine 180 and PE node 135 includes state machine 185. State machine 180 and state machine 185 may be APS state machines configured to interpret received K1/K2 bytes and determine how K1/K2 bytes should be transmitted. Thus, PE node 115 and PE node 135 may act as APS endpoints which make decisions regarding which of PW 170(1) or PW 170(2) should be used at any given time.

For example, when PE node 115 and/or PE node 135 receive two copies of network traffic (one via PW 170(1)/working path 150 and the other via PW 170(2)/protection path 155), PE node 115 and/or PE node 135 may decide which copy to select based on the APS protocol. Inserting K1/K2 bytes in the payload(s) may permit PE node 115 and PE node 135 to utilize APS mechanisms to enable switchover even when there is no communication channel between PE node 125(1) and PE node 125(2). It will be appreciated that although K1/K2 bytes are specifically discussed herein, any suitable protection information may be used, such as Ethernet linear protection switching information, OTN APS/PCC, etc.

PE node 115 and PE node 135 may exchange one or more in-band data packets including the protection information with PE node 125(2) through PSN 120. In this example, PE node 125(2) may be configured to convert between the one or more in-band data packets and a signal (e.g., an optical signal) exchanged between PE node 125(2) and PE node 135 through TDM transport network 130. Each of the one or more in-band data packets may include a payload (e.g., a PW payload) that includes the protection information. Thus, PE node 115 and PE node 135 may exchange one or more in-band data packets having respective payloads with one or more K1/K2 bytes embedded therein. The one or more K1/K2 bytes may, for instance, be embedded at the start of the payload(s).

With continued reference to FIG. 1, FIGS. 2A-2F illustrate various failure scenarios in which PE node 115 and PE node 135 perform switchover operations to maintain communication with each other. Initially (e.g., before any of the failure scenarios depicted in FIGS. 2A-2E occur), both working path 150 and protection path 155 are operable, and PE node 115 and PE node 135 may exchange K1/K2 bytes via PE node 125(1) and PE node 125(2).

In one example, PE node 135 may send the K1/K2 bytes to PE node 125(1) and PE node 125(2) in direction 160(2) and direction 165(2), respectively. PE node 125(1) and PE node 125(2) may both transparently transmit the K1/K2 bytes by packing the K1/K2 bytes inside the payload(s) of one or more in-band data packets and sending the one or more in-band data packets to PE node 115 via PW 170(1) and PW 170(2), respectively. PE node 115 may maintain visibility of system 100 by reading the K1/K2 bytes from the one or more in-band data packets obtained via PW 170(1) and PW 170(2) to interpret the protection information communicated by PE node 135. In one example, PE node 115 may use state machine 180 to interpret the protection information.

PE node 115 may further decide whether to process the one or more in-band data packets obtained via PW 170(1) or PW 170(2). PE node 115 may choose the one or more in-band data packets obtained via PW 170(1), which is associated with working path 150. Thus, the K1/K2 bytes may prompt PE node 115, which may be the head-end of PW 170(1) and PW 170(2), to decide whether to use network traffic from PW 170(1) or PW 170(2). PE node 115 may make this decision without a communication channel between PE node 125(1) and PE node 125(2). PE node 115 may further extract/remove the K1/K2 bytes from the payload(s) and provide the one or more in-band data packets to a de-packetization engine of PE node 115, which may convert the one or more in-band data packets into a signal (e.g., an optical signal) for consumption by CE node 105.

PE node 115 may also send network traffic including K1/K2 bytes to PE node 135 via PW 170(1) and 170(2). For example, PE node 115 may generate additional K1/K2 bytes based on the K1/K2 bytes received from PE node 135, and send back the additional K1/K2 bytes to both PE node 125(1) and PE node 125(2). The additional K1/K2 bytes may be embedded in the payload of one or more in-band data packets. PE node 125(1) and PE node 125(2) may both transparently send the additional K1/K2 bytes to PE node 135. Upon receiving the additional K1/K2 bytes, PE node 135 may respond accordingly based on state machine 185.

Figure 2A:
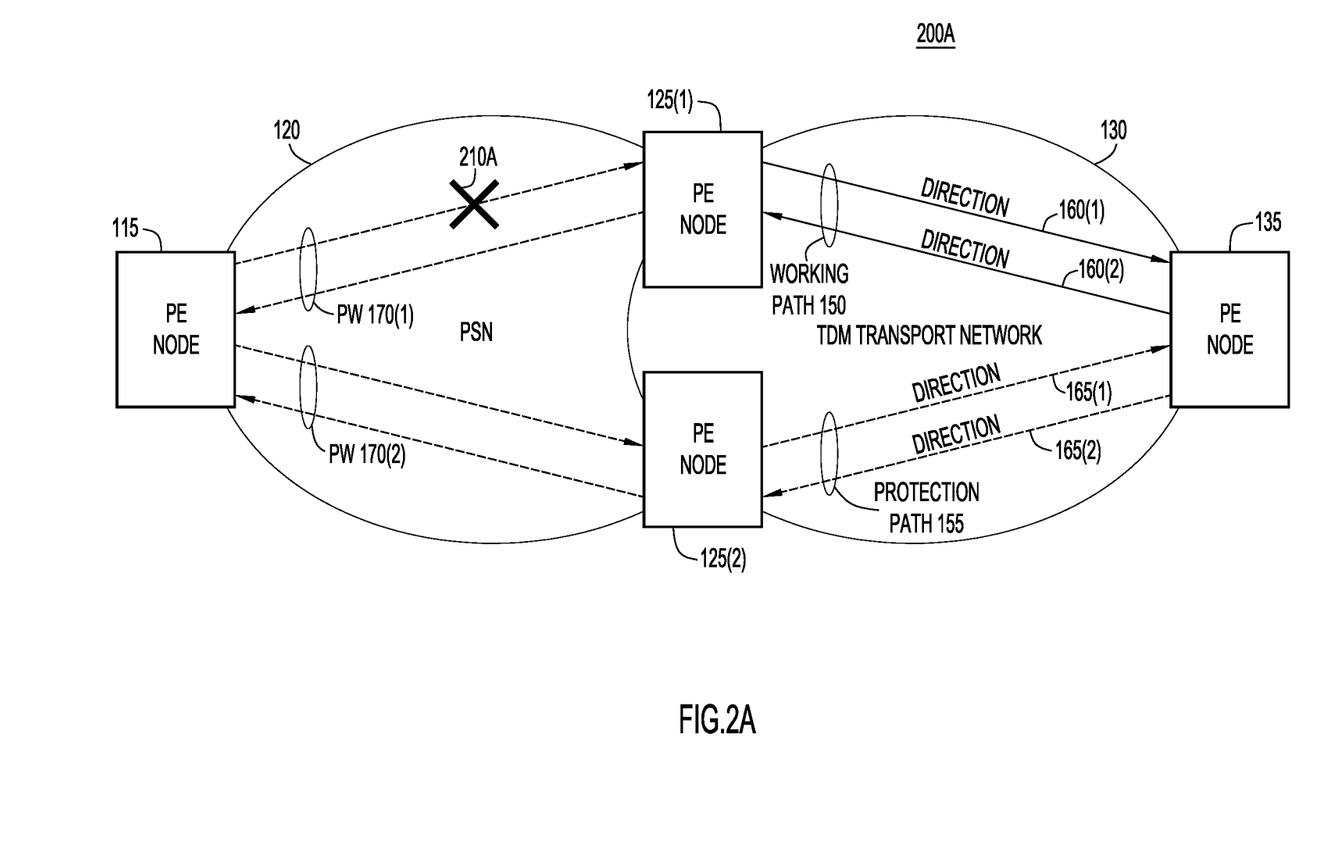
FIG. 2A illustrates a block diagram of a system configured for protection switching when a failure occurs in unidirectional communication from a first Provider Edge (PE) node to a second PE node, according to an example embodiment.

FIG. 2A illustrates a block diagram of an example system 200A configured for protection switching when a failure 210A occurs in unidirectional communication from PE node 115 to PE node 125(1) on PW 170(1). PE node 125(1) has stopped receiving traffic from PE node 115 and, as such, detects/recognizes/identifies failure 210A. PE node 125(1) transmits an Alarm Indication Signal (AIS), in the form of K1/K2 bytes, to PE node 135 via PE node 125(2). PE node 135 receives the AIS and sends first K1/K2 bytes (e.g., K2 byte(s)) to PE node 115 via PE node 125(2). The first K1/K2 bytes may indicate that PE node 115 should switch over from PW 170(1) to PW 170(2). Thus, PE node 115 obtains an indication (e.g., the first K1/K2 bytes) of a unidirectional loss of communication from PE node 115 to PE node 135 via PE node 125(1).

PE node 115 may further provide, to PE node 135, an acknowledgment of the unidirectional loss of communication from PE node 115 to PE node 135 via PE node 125(1). The acknowledgement may include second K1/K2 bytes which indicate that PE node 115 received the first K1/K2 bytes. PE node 135 may receive the second K1/K2 bytes and, in response, switch over to the port corresponding to protection path 155. PE node 135 may further send third K1/K2 bytes (e.g., K2 byte(s)) to PE node 115 via PE node 125(2). The third K1/K2 bytes may notify PE node 115 that PE node 135 has switched over to the port corresponding to protection path 155. PE node 115 may receive the third K1/K2 bytes and, in response, switch over to the port corresponding to PW 170(2). PE node 115 and PE node 135 may thereby communicate over PW 170(2) and protection path 155 via PE node 125(2).

Figure 2B:
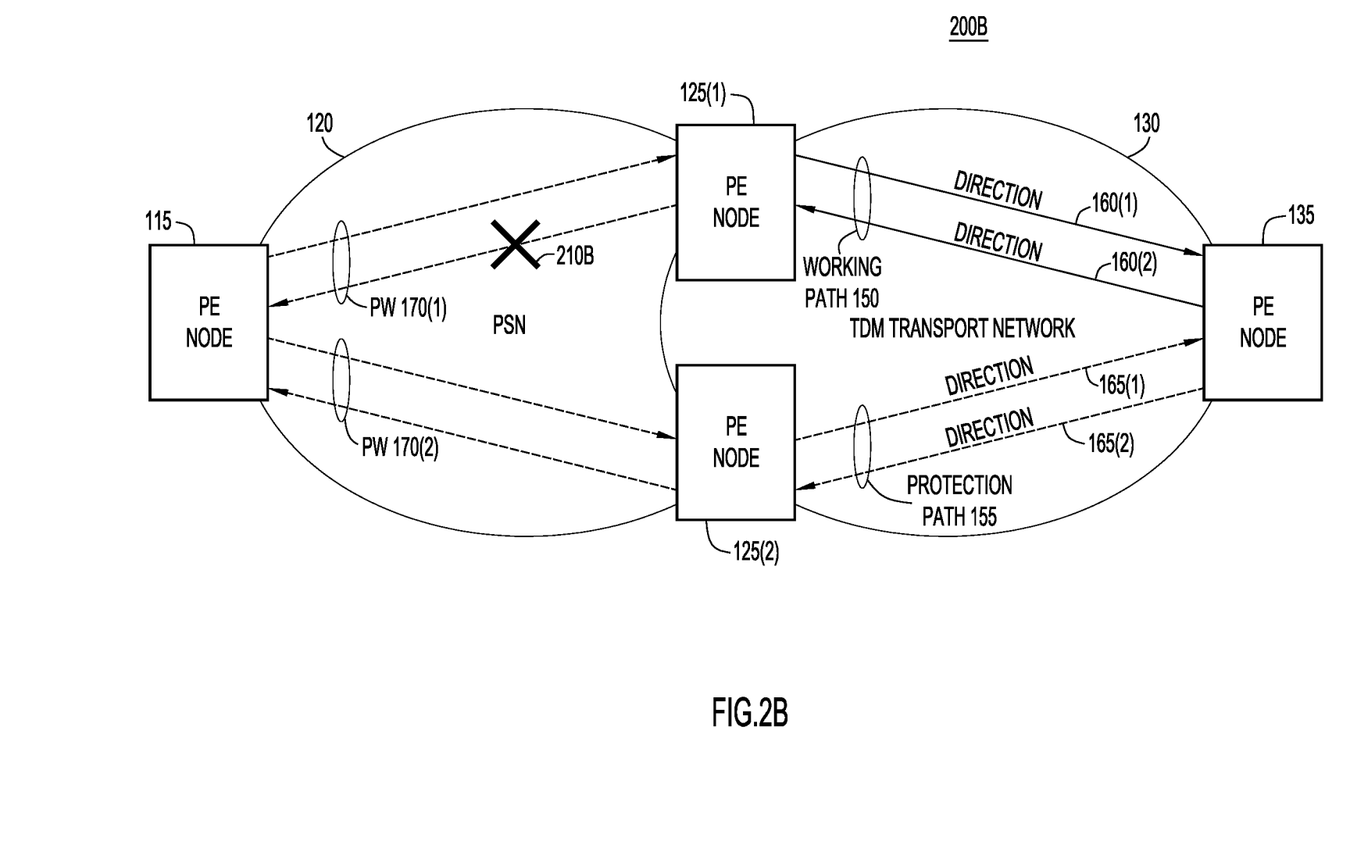
FIG. 2B illustrates a block diagram of a system configured for protection switching when a failure occurs in unidirectional communication from the second PE node to the first PE node, according to an example embodiment.

FIG. 2B illustrates a block diagram of an example system 200B configured for protection switching when a failure 210B occurs in unidirectional communication from PE node 125(1) to PE node 115 on PW 170(1). PE node 115 is experiencing a Loss of Packets (LOPs) from PE node 125(1) and, as such, detects failure 210B. Thus, PE node 115 determines that a unidirectional loss of communication to PE node 115 from PE node 135 via PE node 125(1) has occurred. PE node 115 may provide, to PE node 135, an indication of the loss of unidirectional communication to PE node 115 from PE node 135 via PE node 125(1). The indication may include first K1/K2 bytes (e.g., K2 byte(s)) which indicate that PE node 135 should switch over to protection path 155.

PE node 135 receives the first K1/K2 bytes and transmits an acknowledgment of the loss of unidirectional communication to PE node 115 from PE node 135 via PE node 125(1). The acknowledgment may include second K1/K2 bytes which indicate that PE node 135 received the first K1/K2 bytes. PE node 115 obtains, from PE node 135, the second K1/K2 bytes and, in response, switches over to the port corresponding to PW 170(2). PE node 115 may further send third K1/K2 bytes (e.g., K2 byte(s)) to PE node 135 via PE node 125(2). The third K1/K2 bytes may indicate that PE node 115 has switched over to the port corresponding to PW 170(2). PE node 135 receives the third K1/K2 bytes and, in response, switches over to the port corresponding to protection path 155. PE node 115 and PE node 135 may thereby communicate over PW 170(2) and protection path 155 via PE node 125(2).

Figure 2C:
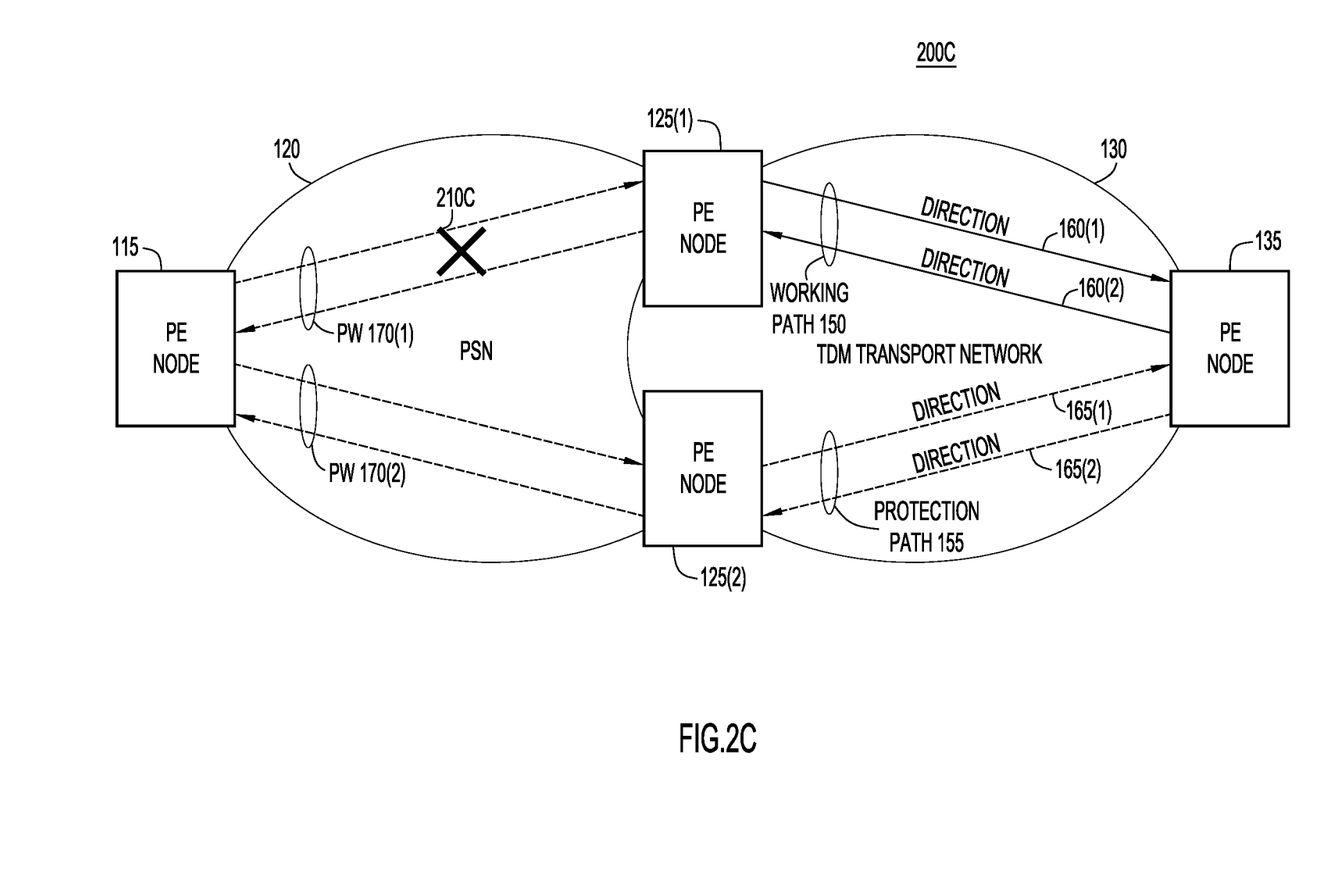
FIG. 2C illustrates a block diagram of a system configured for protection switching when a failure occurs in bidirectional communication between the first PE node and the second PE node, according to an example embodiment.

FIG. 2C illustrates a block diagram of an example system 200C configured for protection switching when a failure 210C occurs in bidirectional communication between PE node 115 and PE node 125(1) on PW 170(1). Here, PE node 115 may exchange protection information relating to a bidirectional loss of communication between PE node 115 and PE node 135 via PE node 125(1).

In one example, the first of PE node 115 and PE node 135 to detect failure 210C may initiate the switchover process. If PE node 135 is the first to detect failure 210C, the procedure explained with reference to FIG. 2A may apply. If PE node 115 is the first to detect failure 210C, the procedure explained with reference to FIG. 2B may apply. PE node 135 may be the first of PE node 115 and PE node 135 to detect failure 210C, because PE node 115 may be configured not to initiate a switchover until a significant number of consecutive packets is lost (e.g., twenty or thirty packets), whereas PE node 135 may be configured to initiate a switchover more quickly.

Figure 2D:
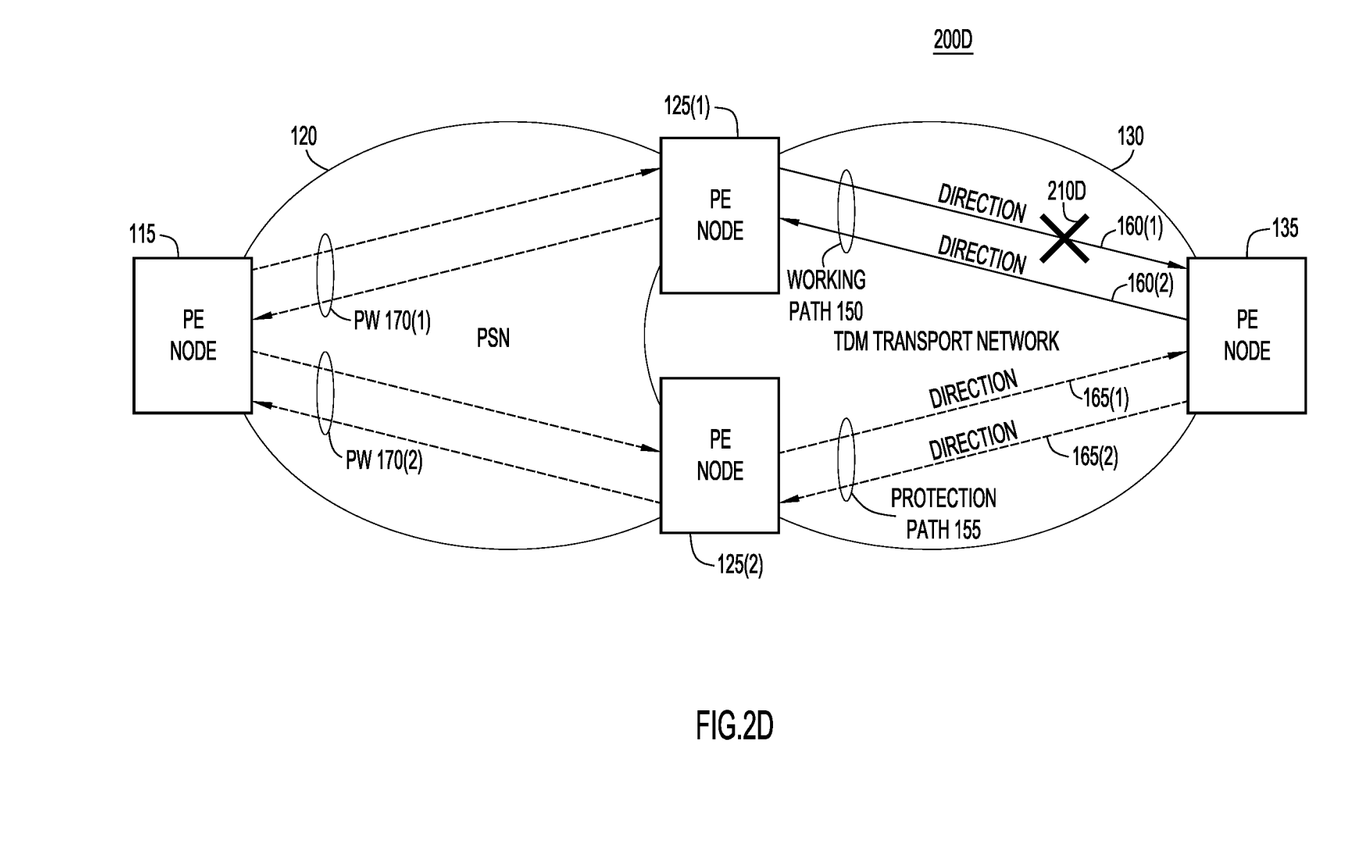
FIG. 2D illustrates a block diagram of a system configured for protection switching when a failure occurs in unidirectional communication from the second PE node to a third PE node, according to an example embodiment.

FIG. 2D illustrates a block diagram of an example system 200D configured for protection switching when a failure 210D occurs in unidirectional communication from PE node 125(1) to PE node 135 in direction 160(1). PE node 135 is experiencing a Loss of Signal (LOS) from PE node 125(1) and, as such, detects failure 210D. PE node 135 sends first K1/K2 bytes (e.g., K2 byte(s)) to PE node 115 via PE node 125(2). The first K1/K2 bytes may indicate that PE node 115 should switch over to PW 170(2)/protection path 155. Thus, PE node 115 obtains an indication of a unidirectional loss of communication from PE node 115 to PE node 135 via PE node 125(1).

PE node 115 may provide, to PE node 135, an acknowledgment of the loss of communication between PE node 115 and PE node 135 via PE node 125(2). PE node 115 may send the acknowledgment to PE node 125(2), which may relay the acknowledgment to PE node 135. The acknowledgment may include second K1/K2 bytes which indicate that PE node 115 received the first K1/K2 bytes. PE node 135 may receive the second K1/K2 bytes and, in response, switch over to the port corresponding to protection path 155.

PE node 135 may further send third K1/K2 bytes (e.g., K2 byte(s)) to PE node 115 via PE node 125(2). The third K1/K2 bytes may indicate that PE node 135 has switched over to the port corresponding to protection path 155. PE node 115 receives the third K1/K2 bytes and, in response, switches over to the port corresponding to PW 170(2). PE node 115 and PE node 135 may thereby communicate over PW 170(2) and protection path 155 via PE node 125(2).

Figure 2E:
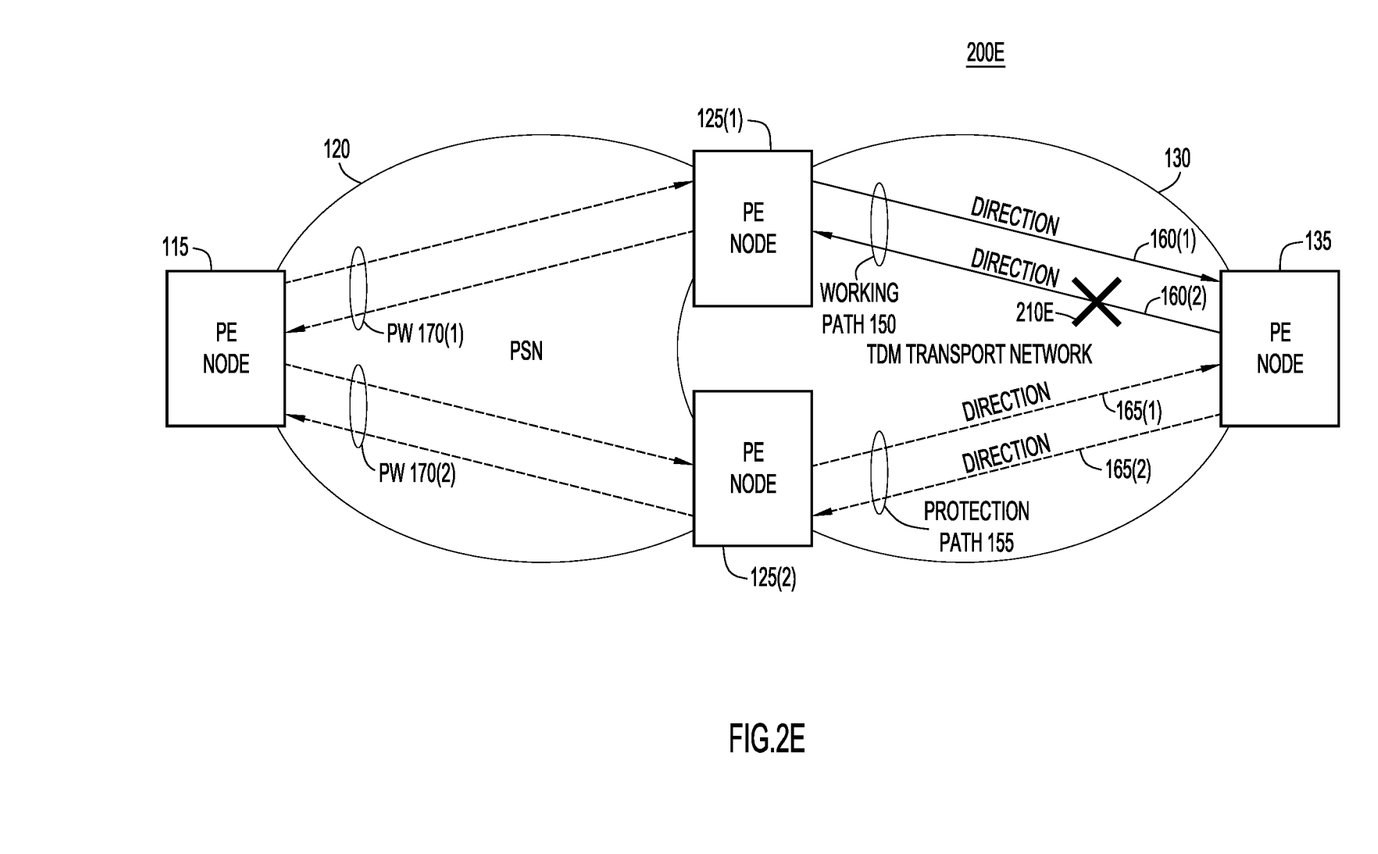
FIG. 2E illustrates a block diagram of a system configured for protection switching when a failure occurs in unidirectional communication from the third PE node to the second PE node, according to an example embodiment.

FIG. 2E illustrates a block diagram of an example system 200E configured for protection switching when a failure 210E occurs in unidirectional communication from PE node 135 to PE node 125(1) in direction 160(2). PE node 125(1) has stopped receiving traffic from PE node 135 and, as such, detects failure 210A. PE node 125(1) transmits an AIS, in the form of K1/K2 bytes, to PE node 115. Thus, PE node 115 determines that a unidirectional loss of communication to PE node 115 from PE node 135 via PE node 125(1) has occurred.

PE node 115 may provide, to PE node 135, an indication of the loss of communication between PE node 115 and the PE node 135 via PE node 125(1). In one example, PE node 115 sends first K1/K2 bytes (e.g., K2 byte(s)) to PE node 135 via PE node 125(2). The first K1/K2 bytes may indicate that PE node 135 should switch over to PW 170(2)/protection path 155. PE node 135 receives the first K1/K2 bytes and transmits second K1/K2 bytes to PE node 115 via PE node 125(2). The second K1/K2 bytes may acknowledge that PE node 135 received the first K1/K2 bytes. Thus, PE node 115 may obtain, from PE node 135, an acknowledgment of the loss of communication between PE node 115 and PE node 135 via PE node 125(1).

In response to receiving the second K1/K2 bytes, PE node 115 switches over to the port corresponding to PW 170(2). PE node 115 may further send third K1/K2 bytes (e.g., K2 byte(s)) to PE node 135 via PE node 125(2). The third K1/K2 bytes may indicate that PE node 115 has switched over to the port corresponding to PW 170(2). PE node 135 receives the third K1/K2 bytes and, in response, switches over to the port corresponding to protection path 155. PE node 115 and PE node 135 may thereby communicate over PW 170(2) and protection path 155 via PE node 125(2).

Figure 2F:
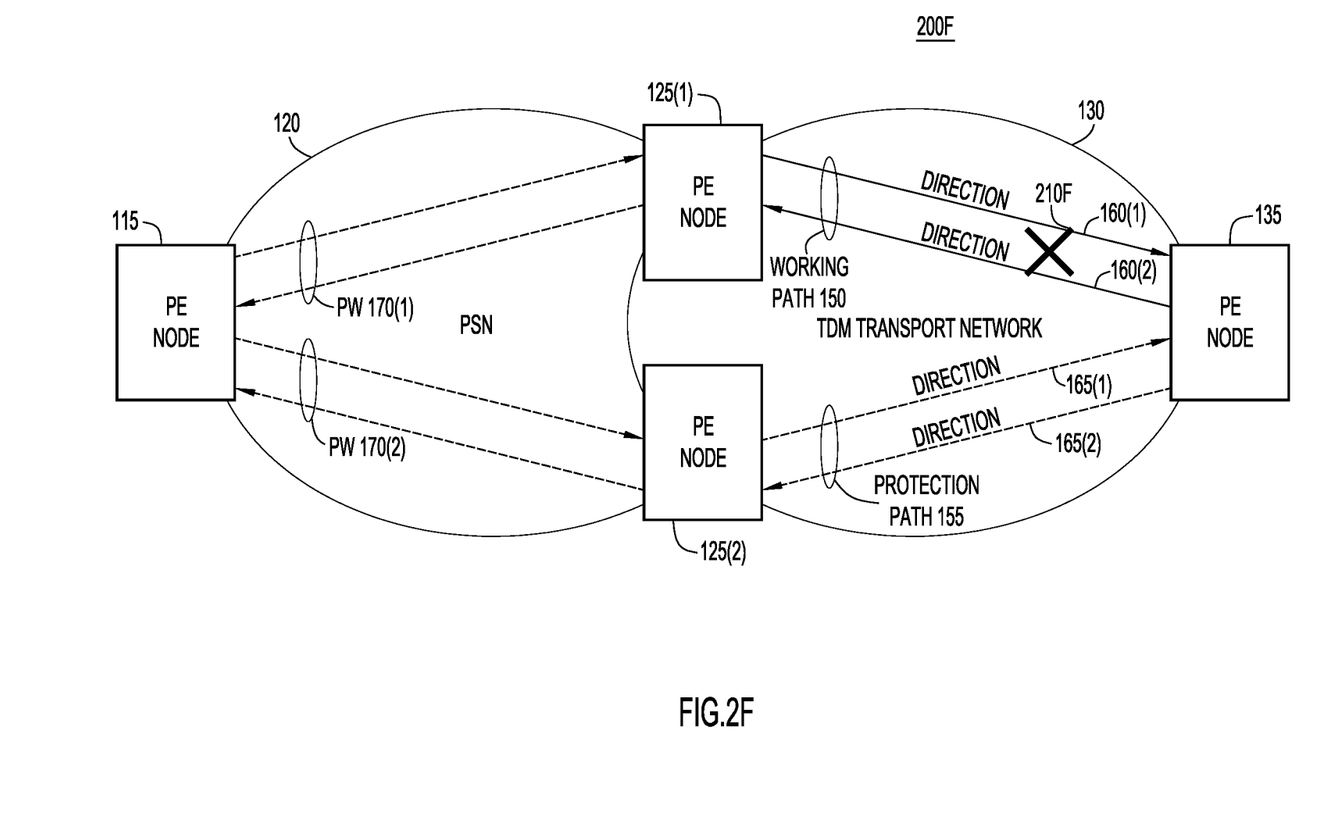
FIG. 2F illustrates a block diagram of a system configured for protection switching when a failure occurs in bidirectional communication between the second PE node and the third PE node, according to an example embodiment.

FIG. 2F illustrates a block diagram of an example system 200F configured for protection switching when a failure 210F occurs in bidirectional communication between PE node 125(1) and PE node 135 on working path 150. Here, PE node 115 may exchange protection information relating to a bidirectional loss of communication between PE node 115 and PE node 135 via PE node 125(1).

In one example, the first of PE node 115 and PE node 135 to detect failure 210F may initiate the switchover process. If PE node 135 is the first to detect failure 210F, the procedure explained with reference to FIG. 2D may apply. If PE node 115 is the first to detect failure 210F, the procedure explained with reference to FIG. 2E may apply. PE node 135 may be the first of PE node 115 and PE node 135 to detect failure 210F, because PE node 115 may be configured not to initiate a switchover until a significant number of consecutive packets is lost (e.g., twenty or thirty packets), whereas PE node 135 may be configured to initiate a switchover more quickly.

Figure 3:
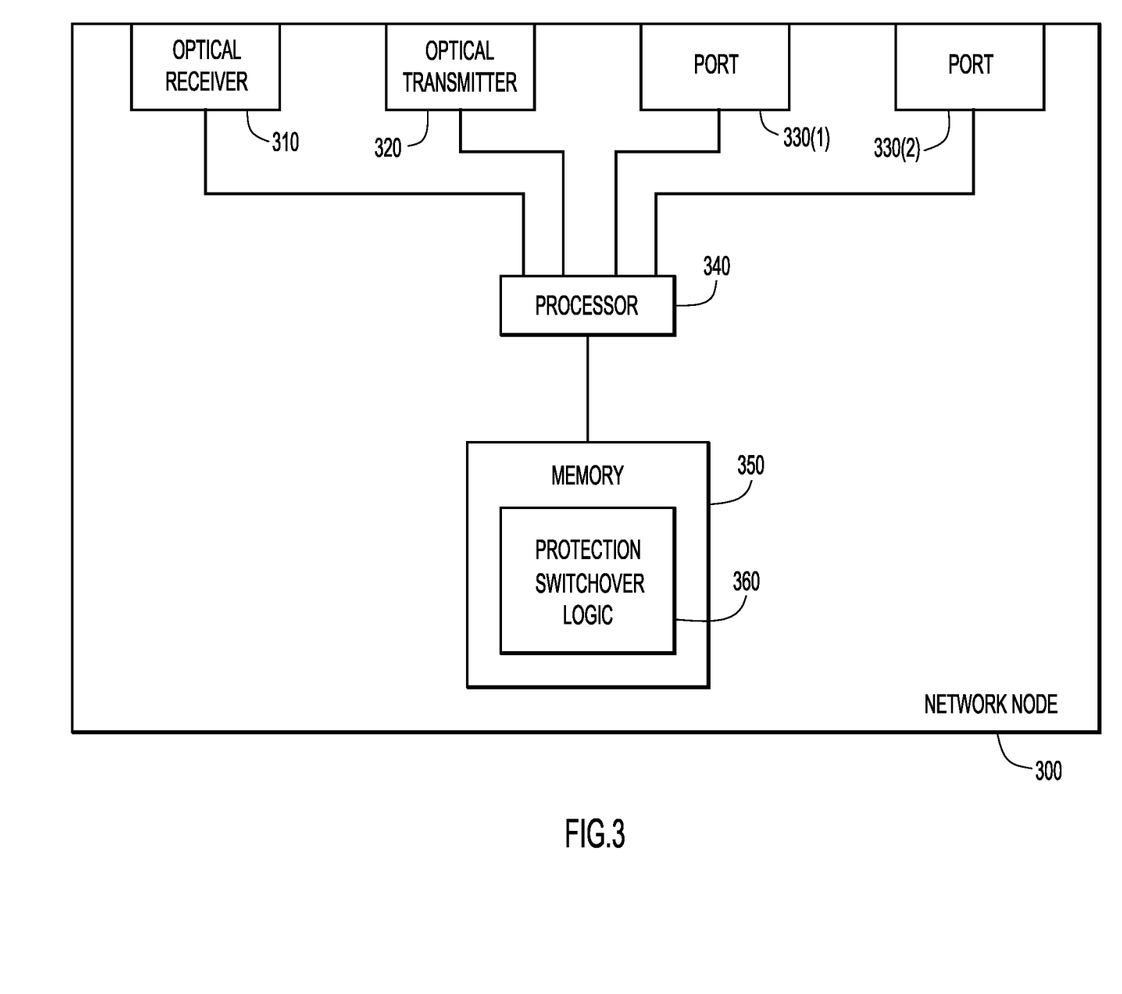
FIG. 3 illustrates a block diagram of a network node configured for protection switching based on an exchange of protection information, according to an example embodiment.

With continued reference to FIG. 1, FIG. 3 illustrates a block diagram of an example network node 300 (e.g., PE node 115(1)) that is configured to implement techniques presented herein. Network node 300 includes a network interface in the form of optical receiver 310 and optical transmitter 320 (including optical and electrical modules) and ports 330(1) and 330(2). Network node 300 also includes one or more processors 340 and memory 350. Processor(s) 340 may include any suitable processing entity, such as microprocessors, microcontrollers, Field-Programmable Gate Arrays (FPGAs), Application-Specific Standard Parts (ASSPs), Application Specific Integrated Circuits (ASICs), etc. Other embodiments may be envisioned.

Memory 350 may include read only memory (ROM), Random Access Memory (RAM), magnetic disk storage media devices, optical storage media devices, Flash memory devices, electrical, optical, or other physical/tangible memory storage devices. Thus, in general, memory 350 may comprise one or more tangible (non-transitory) computer readable storage media (e.g., a memory device) encoded with software comprising computer executable instructions and when the software is executed (e.g., by the one or more processors) it is operable to perform operations described herein. In particular, memory 350 includes protection switchover logic 360 (e.g., protection switchover logic 175) that, when executed, enables network node 300 to perform the techniques described herein.

Figure 4:
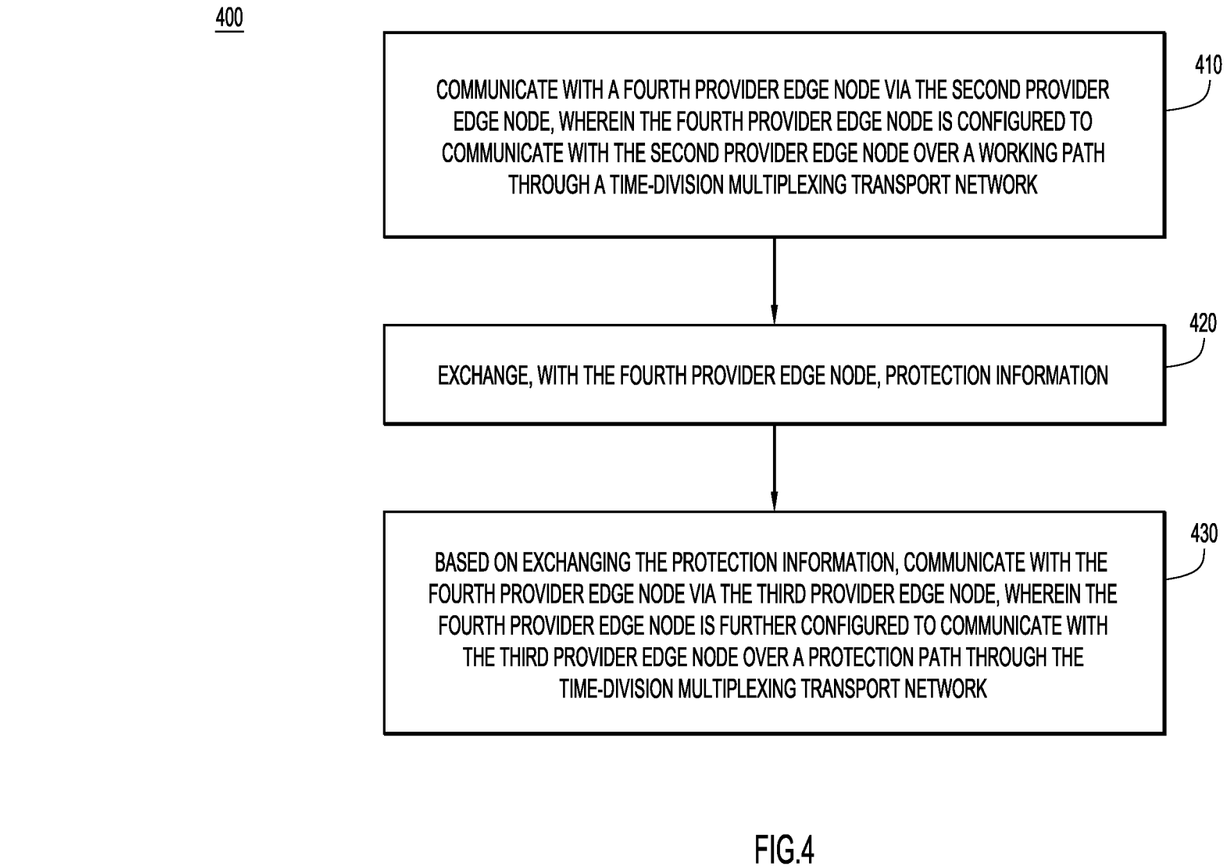
FIG. 4 illustrates a flowchart of a method for protection switching based on an exchange of protection information, according to an example embodiment.

With continued reference to FIG. 1, FIG. 4 is a flowchart of an example method 400 for performing functions associated with operations discussed herein. Method 400 may be performed by a first PE node (e.g., PE node 115) configured to communicate with a second PE node (e.g., PE node 125(1)) through a PSN (e.g., PSN 120) and with a third PE node (e.g., PE node 125(2)) through the PSN. At operation 410, the first PE node communicates with a fourth PE node (e.g., PE node 135) via the second PE node, wherein the fourth PE node is configured to communicate with the second PE node over a working path (e.g., working path 150) through a TDM transport network (e.g., TDM transport network 130).

At operation 420, the first PE node exchanges, with the fourth PE node, protection information. At operation 430, based on exchanging the protection information, the first PE node communicates with the fourth PE node via the third PE node, wherein the fourth PE node is further configured to communicate with the third PE node over a protection path (e.g., protection path 155) through the TDM transport network.

Techniques are described herein which may eliminate the requirement for a communication channel between PE node 125(1) and PE node 125(2), thereby improving multi-router protection for PLE circuits. Protection switching may be accomplished using in-band APS signaling. PE node 135 may provide single-router APS protection, with PE node 125(1) and PE node 125(2) providing the multi-router PW redundancy. The methodology described herein may apply to any suitable architecture (e.g., APS architecture, 1:N architecture, etc.), and may address unidirectional failures or bidirectional failures in PSN 120 and/or TDM transport network 130.

Multi-router protection may also be provided in any suitable topology without requiring a communication channel between PE node 125(1) and PE node 125(2). Such topologies may include line protection networks, Unidirectional Path-Switched Rings (UPSRs), path protected mesh networks, etc. In a line protection network, full SONET (OCn)/OTN (ODUn) frames may be emulated in PSN 120. In a UPSR, paths may be emulated inside TDM transport network 130 (e.g., ODUk, ODUk,j, etc.). In one example, K1/K2 bytes may be used for each PLE circuit.

From the point of view of PE node 135, there may be one ring by which PE node 115 provides the functionality to add or drop working path 150 and/or protection path 155. The ring may include PE node 115, PE node 125(1), PE node 125(2), and PE node 135. Thus, the ring may extend through both PSN 120 and TDM transport network 130, and may include both working path 150 and protection path 155.

The techniques described herein may be operable even without a direct connection between dual-home connected nodes (e.g., PE node 125(1) and 125(2)). In one example, multi-router redundancy may be achieved without requiring this connection by transmitting SONET K1/K2 bytes from the dual-homed Attachment Circuit (AC) side (e.g., PE node 135) to the PW head-end (e.g., PE node 115). The K1/K2 bytes may, upon reaching the PW head-end, provide the PW head-end with full visibility of the dual-homed AC side. The PW head-end may thereby carry out a switchover, if necessary, according to the K1/K2 signals being transmitted over PSN 120.

In certain examples, the switching decision may be mutually driven by PE node 135 and PSN 120 (e.g., PE node 115). For example, when working path 150 breaks (e.g., in direction 160(1)), PE node 135 may send, to PE node 125(2), a K1/K2 message requesting to make protection path 155 active. PE node 135 may receive, from PE node 125(2), an acknowledgment responding to the request. The acknowledgment may prompt PE node 135 to activate protection path 155.

PE node 125(2) may also convey, to PE node 115, a message to start accepting packets from PE node 125(2). This approach may eliminate the requirement for a communication channel between PE node 125(1) and PE node 125(2), as well as the need for additional protocols such as ICRM and PGP, by transparently sending K1/K2 bytes carried in one or more in-band network packets to PE node 115.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Near Field Communication (NFC), mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In one form, a method is provided. The method comprises: at a first provider edge node configured to communicate with a second provider edge node through a packet-switched network and with a third provider edge node through the packet-switched network: communicating with a fourth provider edge node via the second provider edge node, wherein the fourth provider edge node is configured to communicate with the second provider edge node over a working path through a time-division multiplexing transport network; exchanging, with the fourth provider edge node, protection information; and based on exchanging the protection information, communicating with the fourth provider edge node via the third provider edge node, wherein the fourth provider edge node is further configured to communicate with the third provider edge node over a protection path through the time-division multiplexing transport network.

In one example, exchanging the protection information includes: determining that a loss of communication between the first provider edge node and the fourth provider edge node via the second provider edge node has occurred; providing, to the fourth provider edge node, an indication of the loss of communication between the first provider edge node and the fourth provider edge node via the second provider edge node; and obtaining, from the fourth provider edge node, an acknowledgment of the loss of communication between the first provider edge node and the fourth provider edge node via the second provider edge node.

In a further example, determining that the loss of communication between the first provider edge node and the fourth provider edge node via the second provider edge node has occurred includes: determining that a unidirectional loss of communication to the first provider edge node from the fourth provider edge node via the second provider edge node has occurred.

In one example, exchanging the protection information includes: obtaining, from the fourth provider edge node, an indication of a loss of communication between the first provider edge node and the fourth provider edge node via the second provider edge node; and providing, to the fourth provider edge node, an acknowledgment of the loss of communication between the first provider edge node and the fourth provider edge node via the second provider edge node.

In a further example, obtaining the indication of the loss of communication between the first provider edge node and the fourth provider edge node via the second provider edge node includes: obtaining an indication of a unidirectional loss of communication from the first provider edge node to the fourth provider edge node via the second provider edge node.

In one example, exchanging the protection information includes: exchanging one or more in-band data packets including the protection information with the third provider edge node through the packet-switched network, wherein the third provider edge node is configured to convert between the one or more in-band data packets and a signal exchanged between the third provider edge node and the fourth provider edge node through the time-division multiplexing transport network.

In a further example, exchanging the one or more in-band data packets includes: exchanging one or more payloads of the one or more in-band data packets, wherein the one or more payloads include the protection information.

In one example, exchanging the protection information includes: exchanging protection information relating to a bidirectional loss of communication between the first provider edge node and the fourth provider edge node via the second provider edge node.

In one example, exchanging the protection information includes: exchanging one or more bits or bytes indicative of the protection information.

In one example, communicating with the fourth provider edge node via the second provider edge node includes communicating with the fourth provider edge node via the second provider edge node using private line emulation techniques; and communicating with the fourth provider edge node via the third provider edge node includes communicating with the fourth provider edge node via the third provider edge node using the private line emulation techniques.

In one example, exchanging the protection information includes: exchanging information relating to one or more of a loss of communication, signal degradation, signal defects, forced switch, or manual switch.

In another form, an apparatus is provided. The apparatus comprises: a network interface configured to communicate with a first provider edge node through a packet-switched network and with a second provider edge node through the packet-switched network; and one or more processors coupled to the network interface, wherein the one or more processors are configured to: communicate with a third provider edge node via the first provider edge node, wherein the third provider edge node is configured to communicate with the first provider edge node over a working path through a time-division multiplexing transport network; exchange, with the third provider edge node, protection information relating to a loss of communication between the apparatus and the third provider edge node via the first provider edge node; and based on exchanging the protection information, communicate with the third provider edge node via the second provider edge node, wherein the third provider edge node is further configured to communicate with the second provider edge node over a protection path through the time-division multiplexing transport network.

In another form, one or more non-transitory computer readable storage media are provided. The non-transitory computer readable storage media are encoded with instructions that, when executed by a processor of a first provider edge node configured to communicate with a second provider edge node through a packet-switched network and with a third provider edge node through the packet-switched network, cause the processor to: communicate with a fourth provider edge node via the second provider edge node, wherein the fourth provider edge node is configured to communicate with the second provider edge node over a working path through a time-division multiplexing transport network; exchange, with the fourth provider edge node, protection information relating to a loss of communication between the first provider edge node and the fourth provider edge node via the second provider edge node; and based on exchanging the protection information, communicate with the fourth provider edge node via the third provider edge node, wherein the fourth provider edge node is further configured to communicate with the third provider edge node over a protection path through the time-division multiplexing transport network.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The invention claimed is:
1. A method comprising:
at a first provider edge node configured to communicate with a second provider edge node through a packet-switched network and with a third provider edge node through the packet-switched network:
communicating with a fourth provider edge node via the second provider edge node using private line emulation techniques, wherein the fourth provider edge node is configured to communicate with the second provider edge node over a working path through a time-division multiplexing transport network;
determining that a number of consecutive packets from the second provider edge node to the first provider edge node have been lost;
in response to determining that the number of consecutive packets have been lost, exchanging, with the third provider edge node through the packet-switched network, one or more payloads of one or more in-band data packets, wherein the one or more payloads include one or more embedded K1/K2 bytes, wherein the third provider edge node is configured to convert between the one or more in-band data packets and a signal exchanged between the third provider edge node and the fourth provider edge node through the time-division multiplexing transport network; and
based on exchanging the one or more payloads, communicating with the fourth provider edge node via the third provider edge node, wherein the fourth provider edge node is further configured to communicate with the third provider edge node over a protection path through the time-division multiplexing transport network.

2. The method of claim 1, wherein exchanging the one or more payloads includes:
providing, to the fourth provider edge node, an indication of a loss of communication between the first provider edge node and the fourth provider edge node via the second provider edge node; and
obtaining, from the fourth provider edge node, an acknowledgment of the loss of communication between the first provider edge node and the fourth provider edge node via the second provider edge node.

3. The method of claim 1, wherein exchanging the one or more payloads includes:
exchanging protection information relating to a unidirectional loss of communication to the first provider edge node from the second provider edge node.

4. The method of claim 1, wherein exchanging the one or more payloads includes:
exchanging protection information relating to a bidirectional loss of communication between the first provider edge node and the second provider edge node.

5. The method of claim 1, wherein:
communicating with the fourth provider edge node via the third provider edge node includes communicating with the fourth provider edge node via the third provider edge node using the private line emulation techniques.

6. The method of claim 1, wherein exchanging the one or more payloads includes:
exchanging information relating to a loss of communication.

7. The method of claim 6, wherein exchanging the one or more payloads includes: exchanging information relating to signal degradation.

8. The method of claim 6, wherein exchanging the one or more payloads includes: exchanging information relating to signal defects.

9. The method of claim 6, wherein exchanging the one or more payloads includes: exchanging information relating to forced switch.

10. The method of claim 6, wherein exchanging the one or more payloads includes: exchanging information relating to manual switch.

11. An apparatus comprising:
a network interface configured to communicate with a first provider edge node through a packet-switched network and with a second provider edge node through the packet-switched network; and
one or more processors coupled to the network interface, wherein the one or more processors are configured to:
communicate with a third provider edge node via the first provider edge node using private line emulation techniques, wherein the third provider edge node is configured to communicate with the first provider edge node over a working path through a time-division multiplexing transport network;
determine that a number of consecutive packets from the first provider edge node to the apparatus have been lost;
in response to determining that the number of consecutive packets have been lost, exchange, with the second provider edge node through the packet-switched network, one or more payloads of one or more in-band data packets, wherein the one or more payloads include one or more embedded K1/K2 bytes, wherein the second provider edge node is configured to convert between the one or more in-band data packets and a signal exchanged between the second provider edge node and the third provider edge node through the time-division multiplexing transport network; and
based on exchanging the one or more payloads, communicate with the third provider edge node via the second provider edge node, wherein the third provider edge node is further configured to communicate with the second provider edge node over a protection path through the time-division multiplexing transport network.

12. The apparatus of claim 11, wherein the one or more processors are further configured to:
provide, to the third provider edge node, an indication of a loss of communication between the apparatus and the third provider edge node via the first provider edge node; and
obtain, from the third provider edge node, an acknowledgment of the loss of communication between the apparatus and the third provider edge node via the first provider edge node.

13. The apparatus of claim 11, wherein the one or more processors are further configured to:
exchange protection information relating to a bidirectional loss of communication between the apparatus and the first provider edge node.

14. The apparatus of claim 11, wherein the one or more processors are configured to:

communicate with the third provider edge node via the second provider edge node using the private line emulation techniques.

15. The apparatus of claim 11, wherein the one or more processors are further configured to:
exchange protection information relating to a unidirectional loss of communication to the apparatus from the first provider edge node.

16. One or more non-transitory computer readable storage media encoded with instructions that, when executed by a processor of a first provider edge node configured to communicate with a second provider edge node through a packet-switched network and with a third provider edge node through the packet-switched network, cause the processor to:
communicate with a fourth provider edge node via the second provider edge node using private line emulation techniques, wherein the fourth provider edge node is configured to communicate with the second provider edge node over a working path through a time-division multiplexing transport network;
determine that a number of consecutive packets from the second provider edge node to the first provider edge node have been lost;
in response to determining that the number of consecutive packets have been lost, exchange, with the third provider edge node through the packet-switched network, one or more payloads of one or more in-band data packets, wherein the one or more payloads include one or more embedded K1/K2 bytes, wherein the third provider edge node is configured to convert between the one or more in-band data packets and a signal exchanged between the third provider edge node and the fourth provider edge node through the time-division multiplexing transport network; and
based on exchanging the one or more payloads, communicate with the fourth provider edge node via the third provider edge node, wherein the fourth provider edge node is further configured to communicate with the third provider edge node over a protection path through the time-division multiplexing transport network.

17. The one or more non-transitory computer readable storage media of claim 16, wherein the instructions further cause the processor to:
provide, to the fourth provider edge node, an indication of a loss of communication between the first provider edge node and the fourth provider edge node via the second provider edge node; and
obtain, from the fourth provider edge node, an acknowledgment of the loss of communication between the first provider edge node and the fourth provider edge node via the second provider edge node.

18. The one or more non-transitory computer readable storage media of claim 16, wherein the instructions cause the processor to:
exchange protection information relating to a unidirectional loss of communication to the first provider edge node from the second provider edge node.

19. The one or more non-transitory computer readable storage media of claim 16, wherein the instructions cause the processor to:
exchange protection information relating to a bidirectional loss of communication between the first provider edge node and the second provider edge node.

20. The one or more non-transitory computer readable storage media of claim 16, wherein the instructions cause the processor to:
communicate with the fourth provider edge node via the third provider edge node using the private line emulation techniques.

* * * * *